(12) United States Patent
Chapman et al.

(10) Patent No.: US 7,644,201 B2
(45) Date of Patent: Jan. 5, 2010

(54) METHOD AND SYSTEM FOR PERFORMANCE ENHANCEMENT VIA TRANSACTION VERIFICATION USING A COUNTER VALUE IN A POLLED DATA STORAGE ENVIRONMENT

(75) Inventors: Ronald J Chapman, Tucson, AZ (US); Michael T Benhase, Tucson, AZ (US); Gary W Batchelor, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/990,882

(22) Filed: Nov. 17, 2004

(65) Prior Publication Data

US 2006/0106957 A1  May 18, 2006

(51) Int. Cl.
*G06F 13/001* (2006.01)

(52) U.S. Cl. ....................................................... 710/34
(58) Field of Classification Search .................... 710/34
See application file for complete search history.

(56) References Cited

U.S. PATENT DOCUMENTS

| | | | |
|---|---|---|---|
| 4,494,194 A | | 1/1985 | Harris et al. |
| 5,455,911 A | | 10/1995 | Johansson |
| 5,740,189 A | * | 4/1998 | Tiedje ........................ 714/807 |
| 6,182,183 B1 | | 1/2001 | Wingard et al. |
| 6,434,633 B1 | | 8/2002 | Braun et al. |
| 6,535,937 B1 | | 3/2003 | Beardsley et al. |
| 2002/0054570 A1 | * | 5/2002 | Takeda ........................ 370/252 |
| 2002/0118580 A1 | | 8/2002 | Santin |

OTHER PUBLICATIONS

IBM (1994) Technical Disclosure Bulletin 37:335.

* cited by examiner

*Primary Examiner*—Alford W Kindred
*Assistant Examiner*—Brooke J Dews
(74) *Attorney, Agent, or Firm*—Dan Shifrin

(57) ABSTRACT

A method of verifying the passage of a data write across a bus is provided including sending the data write from an originator across the bus to a target, counting the number of data entries received at the target with a counter, and transmitting a return echo write from the target across the bus to a return address. The method further includes attaching the counter value to other data associated with the return echo write and polling the return address. The method allows determination of the completion of a data write by comparing the number of data entries included in the data write with the counter value polled from the return address. Alternatively, in a data streaming environment the progress of a data write may be determined by comparing the number of data entries included in the data write at a select point in time with the counter value polled from the return address. Typical data entries which are counted may include, but are not limited to, bytes, words, double words, or similar data quantities.

22 Claims, 2 Drawing Sheets

METHOD AND SYSTEM FOR PERFORMANCE ENHANCEMENT VIA TRANSACTION VERIFICATION USING A COUNTER VALUE IN A POLLED DATA STORAGE ENVIRONMENT

RELATED APPLICATION DATA

The present application is related to commonly assigned and copending U.S. application Ser. No. 10/991,109, entitled EFFICIENT MAINTENANCE OF MEMORY LIST, filed on the filing date hereof, which application is incorporated herein by reference in its entirety.

TECHNICAL FIELD

The present invention relates to performance enhancement in a polled data storage environment, and more particularly to the use of count based verification of writes across a bus using an echo address location.

BACKGROUND ART

Data storage systems may employ hardware bus systems to provide fast data transfer from hosts such as network servers via the bus system to attached data storage servers having storage devices, cache storage, or nonvolatile cache storage. It is advantageous to provide data storage that operates at relatively fast speeds which approach or match the speeds of the host processors, or which release the host processors during write operations, such that the host processors are not slowed.

The data to be stored through a write command sent across a hardware bus is typically customer data which will be retrieved at a subsequent time. It is of the utmost importance to the customer that the customer data not be lost or compromised. Thus, in addition to fast data storage, there must be some assurance that customer data that has been transmitted across a bus system was received intact. Hence, most channel adapters for the hosts require an acknowledgment that a data transfer write operation has completed successfully.

One type of hardware bus commonly employed in a data storage system is the Peripheral Component Interconnect (PCI) bus system. A PCI bus system is a high performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

In PCI and other bus systems, the channel adapters perform write commands to transfer data to their destinations. Channel adapters may poll (a read command) a hardware indicator that signals "end of transfer," or issue a read command to a location as far down the data path as possible in an attempt to acquire an acknowledgment that the data transfer has completed successfully.

Read operations across a hardware bus are slow and inefficient because a substantial wait is required while the written data is accessed and loaded for passage back through the bus system. Therefore, bus architecture typically blocks the read request from the bus until after the requested data is loaded so as to allow other uses of the bus by other requesters during the load process. An element of the arbitration typically employed by a bus is that the adapter sending a read command must receive a response within a predetermined time or the requester will have to give up the interface as the arbitrator cycles to the next agent having work. As a result, the originator continues to request the read results which are ultimately provided to a buffer to match the request. Therefore, read commands across a bus are extremely slow operations to complete, especially in complex bus systems with multiple hosts and with multiple bridges between the channel adapters and the storage system. During the time required to complete the read, the host adapter that originated the writes which are being verified must pause and wait for the read command to be completed before receiving an acknowledgment that the write operation completed successfully, effectively locking up the host adapter.

The problems attendant with extremely slow read operations across a bus are in part addressed by the use of write command verification as described in commonly assigned U.S. Pat. No. 6,535,937, entitled WRITE COMMAND VERIFICATION ACROSS A PCI BUS SYSTEM, issued Mar. 18, 2003, which patent is incorporated herein by reference in its entirety. The method and system described in U.S. Pat. No. 6,535,937 provides for the asynchronous and prompt verification of a write command across a bus, in particular a PCI bus system. U.S. Pat. No. 6,535,937 discloses a system where the target of the writes has a predetermined "echo" address to which it will respond with an echo write to indicate that the data has arrived at its destination. Thus, the number of reads necessary to verify the successful transmission of customer data is minimized. However, prior systems such as that described in U.S. Pat. No. 6,535,937 do not indicate how many transactions have been processed in a data streaming environment. Thus, prior systems write useful information to the echo location, but provide no way for determining how much data has reached its destination without employing multiple poll or read commands.

SUMMARY OF THE INVENTION

The present invention provides a method of verifying the passage of a data write across a bus including sending the data write from an originator across the bus to a target, counting the number of data entries received at the target with a counter, and transmitting a return echo write from the target across the bus to a return address. The method further includes attaching the counter value to other data associated with the return echo write and polling the return address.

The method allows determination of the completion of a data write by comparing the number of data entries included in the data write with the counter value polled from the return address. Alternatively, in a data streaming environment the progress of a data write may be determined by comparing the number of data entries included in the data write at a select point in time with the counter value polled from the return address. Typical data entries which are counted may include, but are not limited to, bytes, words, double words, or similar data quantities.

In one embodiment of the present invention, the return address may be designated at a first bus adapter associated with the originator. In another embodiment, the return echo write may be built at a second bus adapter associated with a target.

Although described above with respect to a method, the invention may also be implemented as a data processing system having apparatus capable of verifying the passage of a data write across a bus in accordance with the above described method. The invention may also be implemented as an article of manufacture containing instructions for causing the verification of a data write across a bus in accordance with the above described method. In addition, the invention may be implemented as a method of deploying computing infrastructure comprising integrating computer readable code with a data processing system such that the code in combination with the system is capable of verifying a data write across a bus.

DETAILED DESCRIPTION OF THE PREFERRED EMBODIMENT

The present invention is described herein with respect to an exemplary bus system, a PCI bus. It should be noted that the invention is not limited to PCI bus systems, but rather is applicable to any similar hardware busses.

Figure 1:
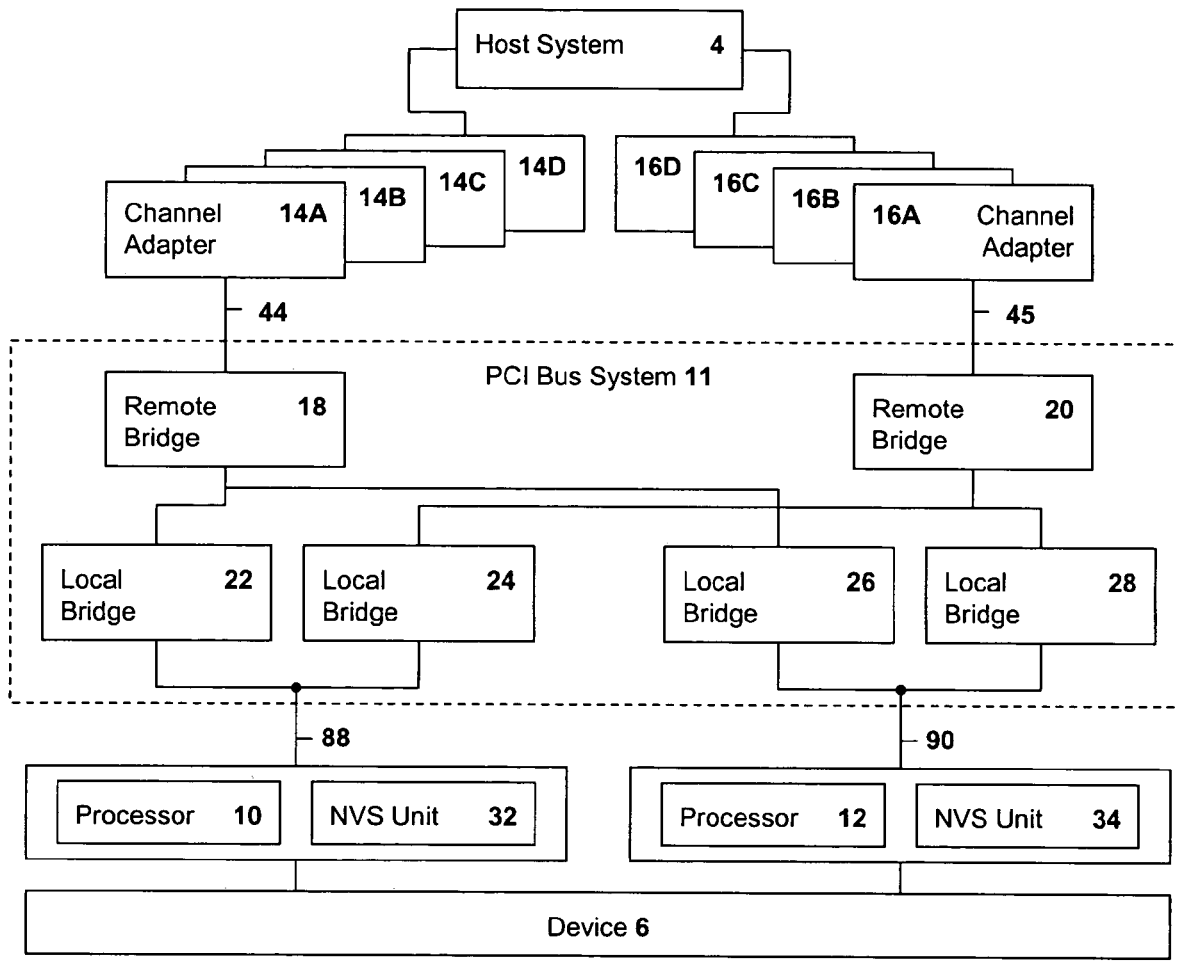
FIG. 1 is a block diagram of a bus system and attached host systems and devices in accordance with an embodiment of the present invention.

Referring to FIG. 1, a PCI bus system 11 is illustrated in accordance with an embodiment of the present invention. The bus 11 provides communication paths, for example, between one or more host systems 4 and devices such as processors 10, 12, and NVS (nonvolatile storage) units 32, 34, all associated with a device 6. The exemplary PCI bus system 11 is based upon that illustrated in incorporated U.S. Pat. No. 6,535,937 employing similar components modified in accordance with the present invention. As discussed in incorporated U.S. Pat. No. 6,535,937, the device 6 may comprise a direct access storage device (DASD) subsystem, such as a string of DASDs.

The PCI bus system 11 allows the host system 4 to communicate with the processors 10, 12 employing adapters 14A, 14B, 14C, 14D; 16A, 16B, 16C, 16D or other communication agents (not shown), including any device that typically communicates over a bus. The channel adapters 14, 16 may comprise channel adapter cards that are each connected via a slot on the PCI bus system 11 to a remote bridge 18, 20. Each channel adapter card provides a connection to one or more host systems 4 at a secondary PCI bus 44, 45. Briefly, processor 10 controls a primary PCI bus 88 and processor 12 controls a primary PCI bus 90, each providing addresses for access by the adapters 14, 16 at secondary PCI busses 44, 45.

Two remote bridges 18, 20 may be provided coupled to different sets of channel adapters or other communication agents, and each remote bridge is coupled to local bridges. Thus, remote bridge 18 is coupled to local bridges 22, 26, and remote bridge 20 is coupled to local bridges 24, 28. In the instant example, the local bridges 22, 24 may communicate with processor 10 and NVS unit 32 on primary PCI bus 88, although other arrangements may be envisioned by those of skill in the art. Thus, in the present example of a PCI bus system, either the adapters 14A, 14B, 14C, 14D; 16A, 16B, 16C, 16D or agents coupled to remote bridge 18, 20 may communicate with the processor 10 or NVS unit 32 over the PCI bus system 11.

An important communication in any bus system employed for data storage is the writing of data by a host system 4 in redundant fashion, e.g., at the NVS unit 32, 34 and at a device 6 under the control of the processor 10, 12 at opposite local bridges. Host systems typically deal with and process large amounts of data and require prompt access to, or storage of, that data to allow the host systems to continue processing without substantial wait times. Therefore, low latency of the bus system is required for such prompt access or storage.

Figure 2:
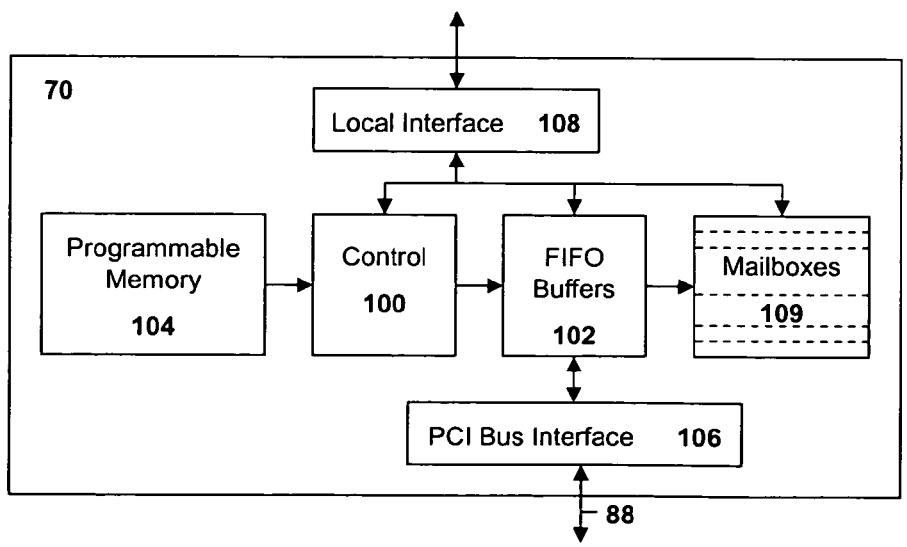
FIG. 2 is a block diagram of a PCI bus adapter.

FIG. 2 illustrates an example of a PCI bus adapter 70, which will typically be operatively disposed at the input to a remote bridge 18, 20 or the output of a local bridge 22, 24, 26, 28. The PCI bus adapters may, for example, comprise the commercially available PCI 9060 PCI Bus Master Interface chip provided by PLX Technology, Inc., 390 Potrero Avenue, Sunnyvale, Calif. 94086.

The PCI bus adapter 70 comprises control logic 100 which is configured with a programmable memory 104, such as a serial EEPROM, a PCI bus interface 106 to PCI bus 88 for example, and a local interface 108. The PCI bus adapter provides two independent bidirectional direct memory access (DMA) channels, and has several FIFO buffers 102. Each DMA channel supports burst transfers and direct bus master transfers. Additionally, the PCI bus adapter is provided with a series of mailbox registers 109 for storing information that may be employed by the PCI bus adapter.

The complexity of a PCI bus system is required to ensure that commands are properly sequenced through the system. As discussed above, the data to be stored is typically customer data which will be retrieved at a subsequent time, and it is of the utmost importance to the customer that the customer data has been transmitted across the PCI bus system intact. Hence, most channel adapters for a host require an acknowledgment or verification that their data transfer write operations have completed successfully. As discussed above, the prior use of PCI read commands in an attempt to acquire an acknowledgment that a data transfer has completed successfully resulted in lengthy wait times, and no additional operations could be initiated for the originating adapters while the responses were in progress.

A method and system are provided in U.S. Pat. No. 6,535,937 for asynchronously verifying the passage of one or more write commands and their accompanying data sent at a secondary PCI bus, e.g., bus 44, through the PCI bus system, e.g., PCI bus system 11, from an originating location coupled to the secondary PCI bus, e.g., adapters 14, to a target location.

The U.S. Pat. No. 6,535,937 bus system reduces the number and delay of read or polling operations that must be done to verify the success of a given write operation by returning an echo write command to a special predetermined return address, typically an otherwise unused mailbox 109 associated with a bus adaptor 70 substantially at the end of the bus system 11. The return echo write command is forwarded through the PCI bus system at high efficiency to the returned address. Receipt of the return echo write command at the return address verifies the passage of the one or more write commands and data through the PCI bus system from the originating location to the location substantially at the end of the PCI bus system.

According to the prior system of U.S. Pat. No. 6,535,937, however, the originator of a write command had no ability to determine how many transactions had been processed or received in a data streaming environment. Thus, the originator had no method of determining exactly how much data had reached its destination at a given point in time. Accordingly, the capabilities of the system described in U.S. Pat. No. 6,535,937, or the capabilities of any hardware bus system which relies on polling to determine the success of write operations, are improved by the present invention by enhancing the use of the echo address at the target of the write data command. When a write data command is sent to the target, the number of data entries, which could be bytes, words, double words, or any other quantifiable data entry, are counted as the data entries are received. In addition to the echo information transmitted to the return address in prior systems, the value of the counter may be sent to the echo address location. In this way, the originating unit can be apprised of exactly how much data has reached its destination. This method and system can be expanded to accommodate many memory segments, each with its own counter.

Figure 3:
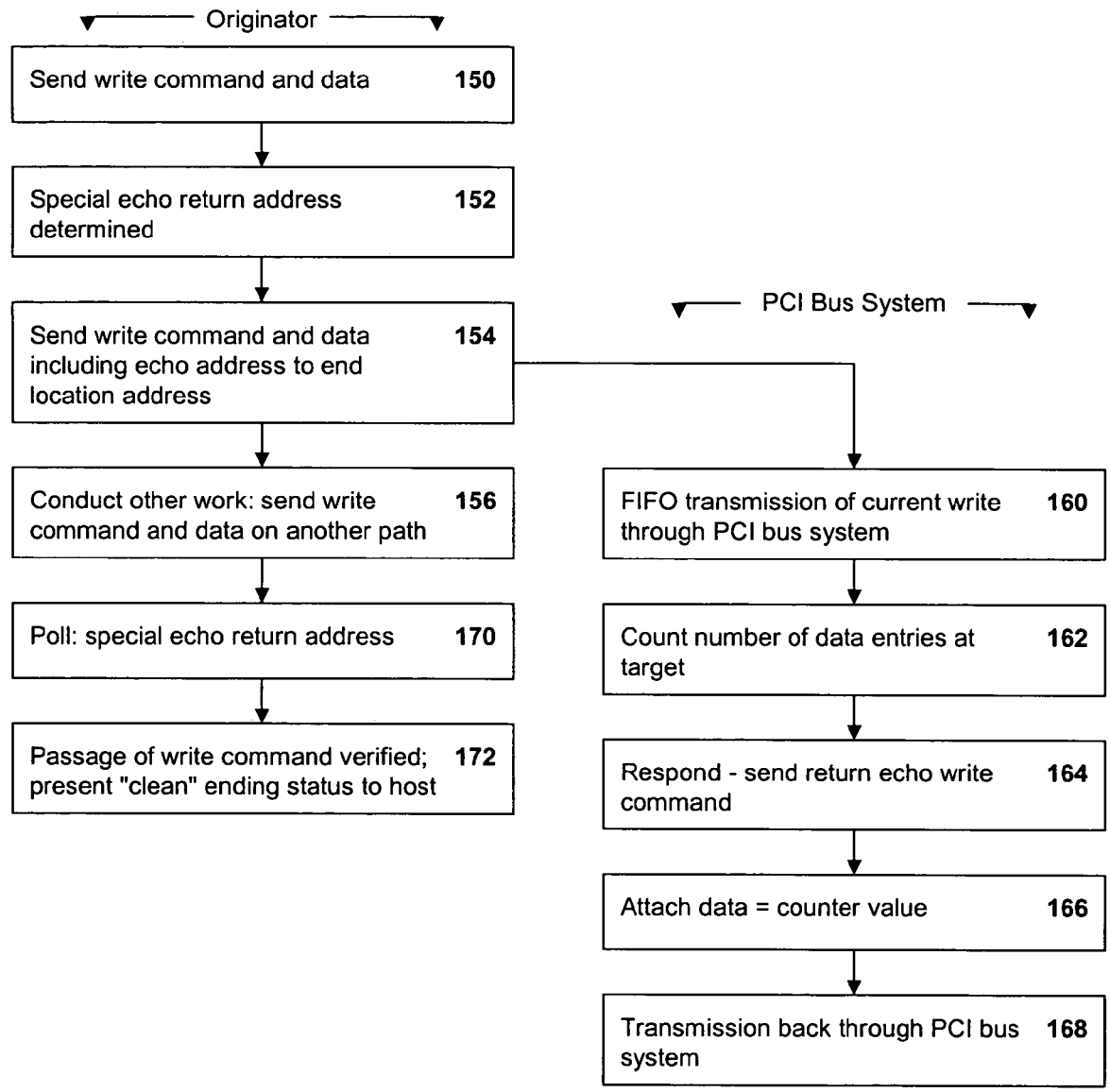
FIG. 3 is a flowchart depicting an embodiment of the method of the present invention.

An embodiment of the method of the present invention is illustrated in FIG. 3. Referring additionally to FIG. 1 and FIG. 2, the originator sends a write command in step 150, e.g., via an adapter 14A, 14B, 14C, 14D, through the PCI bus system 11 to a destination, for example an NVS unit 32. In step 152, the originator adapter determines the special return address.

The originator adapter coupled to the PCI bus system, in step 154, sends the write command onto the PCI bus 44, accompanied by data, the data including the predetermined special echo address. The write command addresses the special end location address, e.g., mailbox 109. Once the write command is on the bus, the channel adapter, in step 156, is freed to conduct other work, such as sending a write command to processor 12.

The bus system 11 causes any prior write commands and data to progress through the bus system 11 before any subsequently sent write command (step 160).

The current data write command is identified by the special end location address. The bus control 100 of the adapter associated with the target (NVS 32), having sensed the current write command (step 164) builds the return echo write command for return to the predetermined echo return address. In addition, a counter associated with the target, e.g., NVS unit 32, will count the number of data entries. As discussed above, data entries could be bytes, words, double words, or any other quantifiable data packet. The data entries are counted as they are received. The data attached to the return echo write command may be the data described in U.S. Pat. No. 6,535,937 plus the value of the counter (step 166).

The return echo write command and accompanying data are then transmitted back through the PCI bus system 11 (step 168).

In step 170, the originating adapter polls the predetermined special echo address to which the echo write command has been sent. Upon polling, the originating adapter can determine a count of bytes, words, double words, etc. received at the target, and thus directly verify the progress and/or successful completion of a write across the hardware bus. If the data count is correct, indicating a successful write, the originating adapter verifies passage of the write commands through the PCI bus system 11, to the location substantially at the end of the PCI bus system (step 172). The originating adapter then signals "clean" status to the host system 4.

While the write command is being processed in accordance with the present invention, the originating adapter is freed to conduct other operations.

The present invention is also applicable for write commands originating at one of the processors 10, 12 of FIG. 1 and directed to the NVS 32, 34 at the other branch of the PCI bus system 11. The special echo address would be at the adapter associated with the originating processor, and the subsequent write command would be sent to an adapter at the end location of the local bridge 22, 24, 26, 28 associated with the target processor.

While the preferred embodiments of the present invention have been illustrated in detail, it should be apparent that modifications and adaptations to those embodiments may occur to one skilled in the art without departing from the scope of the present invention as set forth in the following claims.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to an apparatus, the need in the art may also be met by a method of performance enhancement in a polled data storage environment, a computer program product containing instructions for performance enhancement in a polled data storage environment, or a method for deploying computing infrastructure comprising integrating computer readable code into a computing system for performance enhancement in a polled data storage environment.

What is claimed is:

1. A method of verifying the passage of a data write across a bus comprising:
    at an originator, designating an echo return address;
    sending the data write from the originator across the bus to a target, the data write including a number of data entries and the echo return address;
    freeing the originator to perform other operations;
    receiving the data write at the target;
    at the target, counting the number of data entries in the data write received at the target with a counter;
    building a return echo write at the target, the return echo write including a count of the number of data entries received;
    transmitting the return echo write from the target across the bus to the echo return address;
    polling the echo return address from the originator to obtain the count of the number of data entries received at the target;
    comparing at the originator the count of the number of data entries received at the target with the number of data entries in the data write; and
    sending a verification to a host if the count of the number of data entries received at the target equals the number of data entries in the data write.

2. The method of claim 1 further comprising determining the status of the data write in a data streaming environment by comparing the number of data entries included in the data write at a select point in time with the counter value polled from the return address.

3. The method of claim 2 further comprising returning the status of the data write in the data streaming environment to the originator.

4. The method of claim 1 wherein the data entries are selected from a group consisting of bytes, words and double words.

5. The method of claim 1 wherein the echo return address comprises an address associated with the originator.

6. A method for deploying a data processing infrastructure, comprising integrating computer readable code into a data processing system to verify the passage of a data write across a bus wherein the code in combination with the data processing system is capable of performing the following:

at an originator, designating an echo return address;
sending the data write from the originator across the bus to a target, the data write including a number of data entries and the echo return address;
freeing the originator to perform other operations;
receiving the data write at the target;
at the target, counting the number of data entries in the data write received at the target with a counter;
building a return echo write at the target, the return echo write including the count of the number of data entries received;
transmitting the return echo write from the target across the bus to the echo return address;
polling the echo return address from the originator to obtain the count of the number of data entries received at the target;
comparing at the originator the count of the number of data entries received at the target with the number of data entries in the data write; and
sending a verification to a host if the count of the number of data entries received at the target equals the number of data entries in the data write.

7. The method for deploying a data processing infrastructure of claim 6 wherein the code in combination with the data processing system is further capable of determining the status of the data write in a data streaming environment by comparing the number of data entries included in the data write at a select point in time with the counter value polled from the return address.

8. The method for deploying a data processing infrastructure of claim 7 wherein the code in combination with the data processing system is further capable of returning the status of the data write in the data streaming environment to the originator.

9. The method for deploying a data processing infrastructure of claim 6 wherein the code in combination with the data processing system is further capable of selecting the data entry to be counted from a group consisting of bytes, words and double words.

10. The method for deploying a data processing infrastructure of claim 6 wherein the code in combination with the data processing system is further capable of designating the return address as an address with the originator.

11. A data processing system comprising:

an originator comprising means for sending a data write across a bus, after which the originator is free to perform other operations, the data write including a number of data entries and an echo return address designated at the originator;
a bus in communication with the originator;
a target in communication with the bus, the target comprising:
means for receiving the data write and means for transmitting a return echo write from the target across the bus to a return address;
a counter comprising means for counting the number of data entries received at the target;
means for building a return echo write at the target, the return echo write including the count of the number of data entries received;
means for including the counter value with the return echo write;
means for transmitting the return echo write from the target across the bus to the echo return address; and
the originator further comprising:
means for polling the return address to obtain the count of the number of data entries received at the target
means for comparing the count of the number of data entries received at the target with the number of data entries in the data write; and
means for sending a verification to a host if the count of the number of data entries received at the target equals the number of data entries in the data write.

12. The data processing system of claim 11 further comprising means for determining the status of the data write in a data streaming environment by comparing the number of data entries included in the data write at a select point in time with the counter value polled from the return address.

13. The data processing system of claim 12 further comprising means for returning the status of the data write in the data streaming environment to the originator.

14. The data processing system of claim 11 wherein the data entries are selected from a group consisting of bytes, words and double words.

15. The data processing system of claim 11 wherein the echo return address comprises an address associated with the originator.

16. The data processing system of claim 11 further comprising a second bus adapter associated with the target, the second bus adapter comprising means for building the return echo write.

17. An article of manufacture for use in programming a data storage system, when performed by a processor, to verify the passage of a data write across a bus, the article of manufacture comprising instructions for:

at an originator, designating an echo return address;
sending the data write from the originator across the bus to a target, the data write including a number of data entries and the echo return address;
freeing the originator to perform other operations;
receiving the data write at the target;
at the target, counting the number of data entries in the data write received at the target with a counter;
building a return echo write at the target, the return echo write including a count of the number of data entries received;
transmitting the return echo write from the target across the bus to the echo return address;
polling the echo return address from the originator to obtain the count of the number of data entries received at the target;
comparing at the originator the count of the number of data entries received at the target with the number of data entries in the data write; and
sending a verification to a host if the count of the number of data entries received at the target equals the number of data entries in the data write.

18. The article of manufacture of claim 17 further comprising instructions for determining the status of the data write in a data streaming environment by comparing the number of data entries included in the data write at a select point in time with the counter value polled from the return address.

19. The article of manufacture of claim 18 further comprising instructions for returning the status of the data write in the data streaming environment to the originator.

20. The article of manufacture of claim 17 further comprising instructions for selecting the data entry to be counted from a group consisting of bytes, words and double words.

21. The article of manufacture of claim 17 wherein the echo return address comprises an address associated with the originator.

22. The article of manufacture of claim 17 further comprising instructions for building the return echo write at a second bus adapter associated with the target.

* * * * *

UNITED STATES PATENT AND TRADEMARK OFFICE
CERTIFICATE OF CORRECTION

PATENT NO. : 7,644,201 B2
APPLICATION NO. : 10/990882
DATED : January 5, 2010
INVENTOR(S) : Chapman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Sixteenth Day of November, 2010

David J. Kappos
*Director of the United States Patent and Trademark Office*